(12) United States Patent
Han et al.

(10) Patent No.: US 8,613,424 B2
(45) Date of Patent: Dec. 24, 2013

(54) DISC VALVE WITH DIVERSION HOLE

(75) Inventors: Jingbo Han, Beijing (CN); Yingren Ding, Beijing (CN)

(73) Assignee: Beijing Aerospace Propulsion Institute, Beijing (CN)

( * ) Notice: Subject to any disclaimer, the term of this patent is extended or adjusted under 35 U.S.C. 154(b) by 0 days.

(21) Appl. No.: 13/513,660

(22) PCT Filed: Nov. 2, 2010

(86) PCT No.: PCT/CN2010/078311
§ 371 (c)(1),
(2), (4) Date: Jul. 17, 2012

(87) PCT Pub. No.: WO2012/051763
PCT Pub. Date: Apr. 26, 2012

(65) Prior Publication Data
US 2012/0280164 A1   Nov. 8, 2012

(30) Foreign Application Priority Data

Oct. 22, 2010   (CN) .......................... 2010 1 0517589

(51) Int. Cl.
*F16K 1/16*   (2006.01)
(52) U.S. Cl.
USPC ........................... 251/302; 251/327; 251/329
(58) Field of Classification Search
USPC ......... 251/301, 302, 303, 298, 326, 327, 328, 251/329, 178, 177, 195, 196, 197
See application file for complete search history.

(56) References Cited

U.S. PATENT DOCUMENTS

| | | | | |
|---|---|---|---|---|
| 1,416,431 A | * | 5/1922 | Gemmel | 137/246.21 |
| 1,869,741 A | * | 8/1932 | Du Bois | 251/176 |
| 2,660,191 A | * | 11/1953 | Volpin | 104/32.1 |

(Continued)

FOREIGN PATENT DOCUMENTS

| CN | 87 1 03679 A | 11/1988 |
|---|---|---|
| CN | 200989458 Y | 12/2007 |

(Continued)

OTHER PUBLICATIONS

Mar. 24, 2011 Written Opinion of the International Searching Authority issued in International Patent Application No. PCT/CN2010/078311 (with partial translation).
Apr. 7, 2011 International Search Report issued in International Patent Application No. PCT/CN2010/078311 (with translation).

*Primary Examiner* — John Bastianelli
*Assistant Examiner* — Andrew J Rost
(74) *Attorney, Agent, or Firm* — Oliff & Berridge, PLC (57) ABSTRACT

A disc valve with a diversion hole for a solid granule medium aims to solve the problem of material accumulation in a valve cavity and includes a valve body with a valve passage, the valve cavity communicated with the valve passage is formed in the valve body, a valve disc for closing and opening the passage is arranged in the valve cavity, the valve disc is fixedly connected with a valve rod through a valve rod connecting hole of an eyeglasses plate, and the eyeglasses plate is also provided with the diversion hole and a hole for placing the valve disc. The outer wall diameter of the diversion hole is greater than the diameter of the valve passage, and the height of the diversion hole is the same as the length of the valve passage passing through the valve cavity.

7 Claims, 8 Drawing Sheets

(56) References Cited

U.S. PATENT DOCUMENTS

| | | | | |
|---|---|---|---|---|
| 2,793,831 A | * | 5/1957 | Doster | 251/197 |
| 2,826,391 A | * | 3/1958 | Bredtschneider | 251/167 |
| 3,924,832 A | * | 12/1975 | Babcock | 251/301 |
| 4,412,671 A | * | 11/1983 | Tiefenthaler | 251/31 |
| 5,396,919 A | | 3/1995 | Wilson | |
| 7,600,528 B2 | * | 10/2009 | Brzoska et al. | 137/241 |
| 7,819,378 B2 | * | 10/2010 | Jennings | 251/77 |

FOREIGN PATENT DOCUMENTS

| | | |
|---|---|---|
| CN | 101482184 A | 7/2009 |
| CN | 201437848 U | 4/2010 |
| CN | 101725722 A | 6/2010 |
| GB | 154074 | 11/1920 |

\* cited by examiner

Prior Art

Fig.1

Prior Art

Fig.2

Prior Art

DISC VALVE WITH DIVERSION HOLE

FIELD OF THE INVENTION

The present invention belongs to a disc valve, and particularly relates to a disc valve with a diversion hole for a solid granule medium.

BACKGROUND OF THE INVENTION

Disc valve is a device with the round disc providing opening and closing function, and the rotation of the disc is centered by its axis and cycling along the sealing surface of the valve seat. The application of disc valve covers the polycrystalline silicon, organic silicon and coal chemical industries. The disc is driven by the actuator through the valve stem, and as the movement proceeds, the whole sealing surface of the disc is moving against the sealing seat tightly with the compression of the spring, in case that the granule medium flows into the sealing surface.

Figure 1:
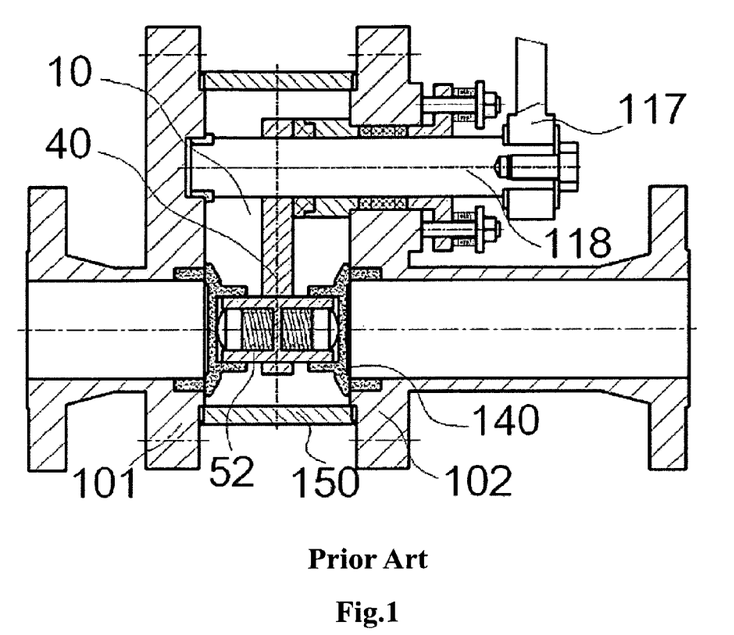
FIG. 1 shows the structure of the disc valve of the prior art.

As shown in FIG. 1, the known disc valve comprises a hollow cylindrical middle valve body 150, and the left valve body 101 and right valve body 102 are beside each side of the middle valve body 150; in the valve cavity 10, the rotation of sealing disc 140 is controlled by movement of the valve stem 118 through the rod 40 and the spring cavity 52. However, this kind of disc valve has following defects.

Figure 2:
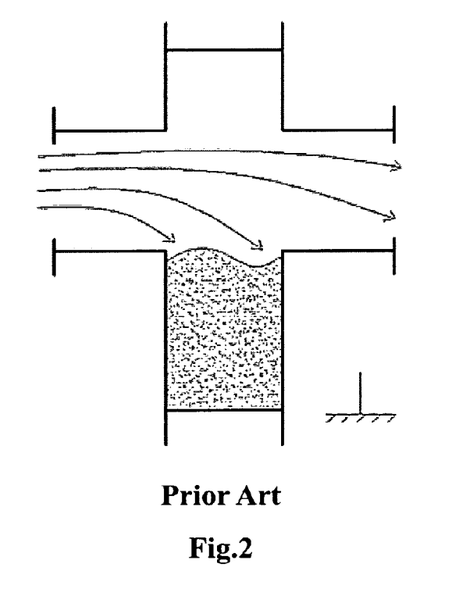
FIG. 2 shows the horizontal installation of the disc valve of prior art and the material accumulation in the cavity.

1) Prone to accumulating materials in the valve cavity. As in FIG. 2, the valve passage lies in the horizontal direction, and the diameter of the valve body is much larger than that of the passage pipe. Therefore, materials cannot be discharged totally in the opening and closing process so that the materials stay in the valve cavity. Furthermore the valve cannot open and/or close in the right place and even is stuck.

Figure 3:
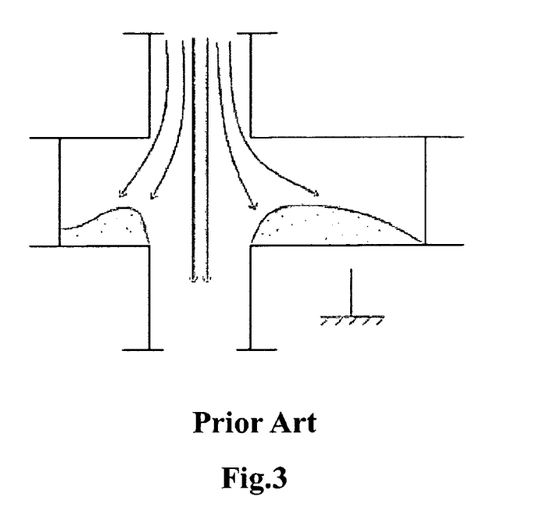
FIG. 3 shows the vertical installation of the disc valve of prior art and the material accumulation in the cavity.

2) Installation direction is limited. When the valve is installed horizontally (as in FIG. 2, the direction of stem is horizontal), the problem of material accumulation is worse. When the valve is vertically installed (as in FIG. 3, the direction of the stem is vertical and the passage is vertical too), the consequence seems better but the problem cannot be solved completely. Material accumulation of the disc valve makes it difficult to arrange pipes or install the valve by considering the influence of installation direction. Horizontal installation is worse than vertical installation with the effect of material accumulation, and upper inlet is worse than bottom inlet when installed obliquely. The best installation requirements cannot be satisfied with the limitation of practical spatial conditions.

3) Large loss of differential pressure. When the materials are flowing from the passage to the valve cavity, the volume of the materials increases so fast that the pressure goes down.

4) Unprotected opening sealing surface. When the valve is in the opening position, the sealing surface of the valve seat is not protected, and is abraded by the material flow, leading to the influence of the sealing effect of the valve and the reduction of its service life.

5) Influence of outer sealing in high temperature conditions. When the cavity touches the high-temperature materials directly, it requires a high quality of the gaskets, and the sealing condition is difficult to implement. Since the service life of the gaskets is limited, the entire valve should be dismounted when changing the bad gaskets.

SUMMARY OF THE INVENTION

The main object of the disc valve with the diversion hole is to solve the problem of material accumulation in a valve cavity.

In accordance with one embodiment of the present invention there is provided a valve comprising a valve body with a valve passage, said valve body having a cavity communicating said passage, said valve body having a valve stem assembly, the stem in the stem assembly connecting a rod in the cavity, said rod having a diversion hole controlling the material flow through the passage, said rod having a disc controlling the closing of the valve.

In the above embodiment of the present invention, the height of the diversion hole equals the length of the valve passage in the valve cavity, and the diameter of the outer wall of the diversion hole is larger than that of the valve passage.

In the above embodiment of the present invention, said rod is an eyeglasses plate comprising a stem-connecting hole, diversion hole and disc-placing hole, said stem-connecting hole connecting the valve stem and the eyeglass, said disc-placing hole having a spring cavity in the center, a baffle plate connecting said spring cavity and said disc-placing hole, with disc placed in the disc-placing hole and pushed by the spring in the spring cavity.

In the above embodiment of the present invention, the distance between the axes of the valve passage and the stem, the distance between the centers of the diversion hole and the stem-connecting hole, the distance between the centers of disc-placing hole and the stem-connecting hole, are the same.

In the above embodiment of the present invention, the eyeglasses plate is sector, semicircle or T-shaped as a whole or welded by different pieces.

In accordance with two embodiments of the present invention there is provided a double-disc valve comprising an eyeglasses plate with disc-placing hole installing one disc on each side; or a single-disc valve comprising an eyeglasses plate with disc-pacing hole installing one disc on one side and an end wall on the other side.

In the above embodiment of the present invention, the eyeglasses plate has ventholes on the baffle plate in the disc-placing hole.

In the above embodiment of the present invention, the height of the disc-placing hole equals the height of the diversion hole, and the diameter of the inner wall of the diversion hole equals the diameter of the valve passage.

In the above embodiment of the present invention, the valve comprises valve seats in the place the valve passage communicating the valve cavity, and the minimum distance between the inner wall of the diversion hole and the inner wall of the disc-placing hole is less than the width of the sealing surface of the valve seats.

In accordance with another embodiment of the present invention there is provided a valve comprising a valve body, valve passage, valve seat, stem in the valve cavity, eyeglasses plate welded by pieces, the welded eyeglasses plate comprising spring cavity, connecting plate, side plate, disc sleeve and diversion tube; the connecting plate having three holes: stem-connecting hole fixed with the stem, diversion hole welded with the diversion tube concentrically; another hole welded with the spring cavity and the disc sleeve concentrically; the side plate is also a piece of flat plate with two holes: one welded with the diversion tube concentrically; the other welded with the disc sleeve concentrically.

The other objects of the invention are:

1) With the diversion hole communicating the valve passage and the cavity, the materials flow through the diversion hole without reaching the cavity, which avoids the material accumulation problem. The object is to change the structure of the cavity of the conventional valve to avoid the materials staying in the cavity when passing through the passage which would lead to unsmooth movement of the valve or the failure of full opening and closing.

Moreover, with the elimination of material accumulation in cavity, the limitation of installing position is also removed.

2) Since the diameter of the inner wall of the diversion hole equals that of the valve passage and the diameter of the outer wall of the diversion hole exceeds that of the valve passage, there forms a straight pipe for the materials passing through in the opening condition without turbulence by the change of space. The object of avoiding loss of differential pressure is achieved in the full opening position.

Besides, the diversion hole could keep the sealing surface of the seat away from abrasion in the full opening position and lower the real temperature of the gaskets so as to lengthen the service life. But the conventional disc valve makes the sealing surface of the seat expose completely into the material (eg. solid granule medium) abrasion circumstance, which destroys the sealing quality and effect.

3) The structure of the eyeglasses plate, which comprises a stem-connecting hole, diversion hole and disc-placing hole, reduces the high requirement of weld intensity which is needed in the conventional disc valve because of the connection of spring cavity, rod and stem. The eyeglasses plate which has ventholes near the spring cavity levels the intensity of the valve stem assembly and increases the stability in the operation.

4) The sizes of the eyeglasses plate, which include the distance between the axes of the valve stem and the passage, the distance between the centers of the diversion hole and the stem-connecting hole, the distance between the centers of disc-placing hole and the stem-connecting hole, lengthen the distance between the stem and the disc with the consideration of movement range of the eyeglasses plate in the opening and closing position for the minimum space premise. Therefore, with the length of rocker arm unchanged, the rotation arc α of the disc is decreased when working and the structure of the valve is more compact.

In the figures the numbers stand for: 10 valve cavity, 40 rod, 49 stem-connecting hole, 50 eyeglasses plate, 51 diversion hole, 52 spring cavity, 53 connecting plate, 54 side plate, 55 disc sleeve, 56 diversion tube, 57 disc-placing hole, 58 venthole, 59 baffle plate, 150 middle valve body, 100 valve stem assembly, 101 left valve body, 102 right valve body, 103 gaskets, 104 left valve seat, 105 right valve seat, 107 bolt, 108 nut, 112 sleeve, 113 compression ring, 114 packing assembly, 116 packing plate, 117 rocker arm, 118 valve stem, 140 sealing disc.

DETAILED DESCRIPTION OF THE PREFERRED EMBODIMENTS

The present invention of the disc valve with diversion hole is described in details with the illustration of figures and embodiments as follows:

Embodiment 1

Figure 4:
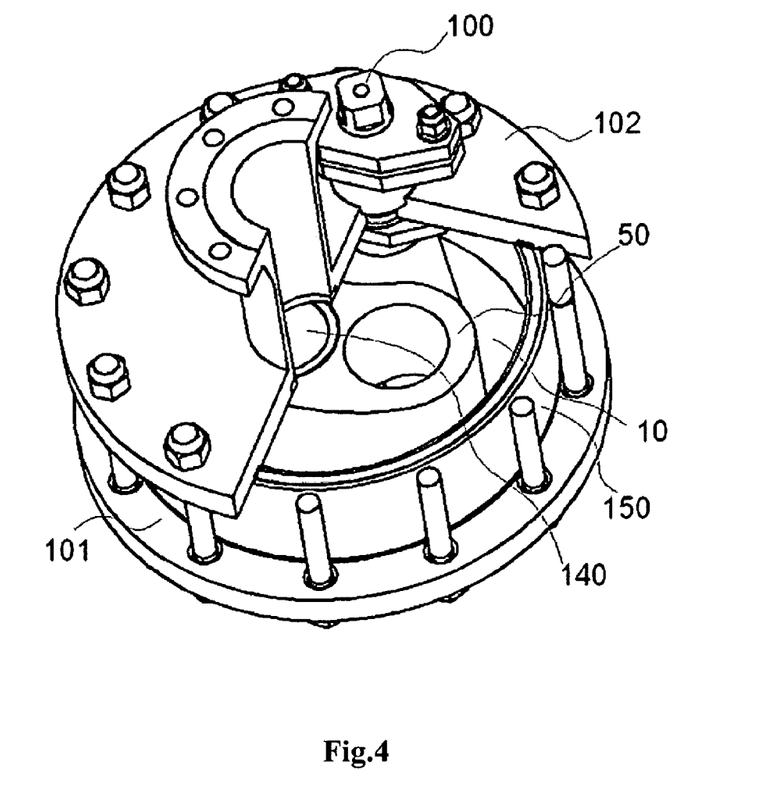
FIG. 4 is a prospective view of the first embodiment of the present invention with two discs and an eyeglasses plate with diversion hole.
Figure 5:
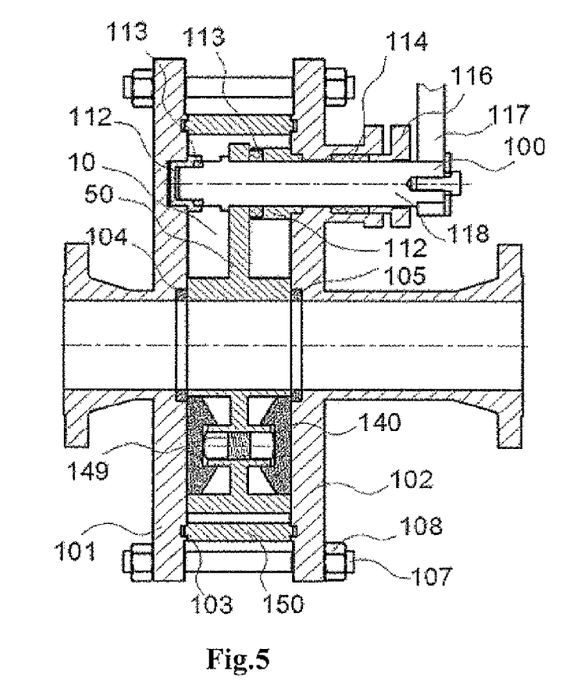
FIG. 5 is the partial cross-sectional view of the embodiment in FIG. 4.
Figure 6:
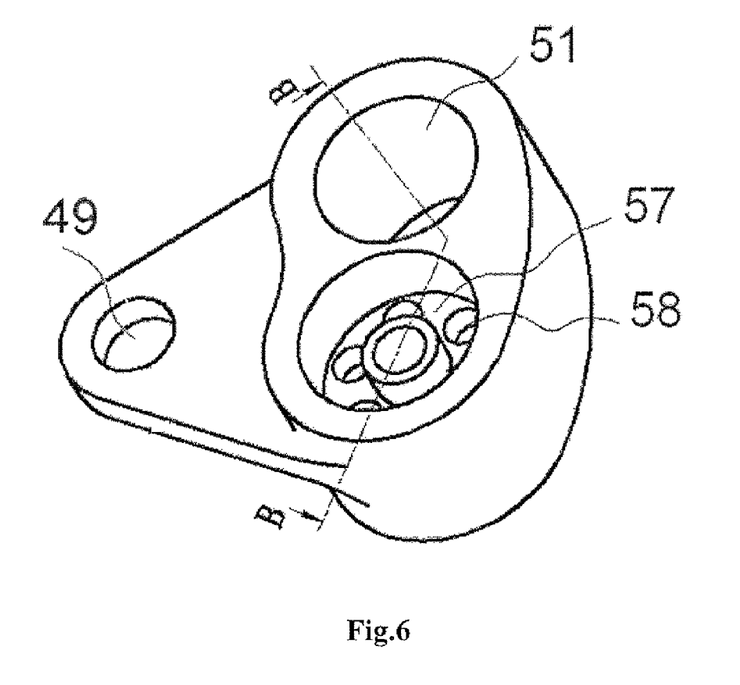
FIG. 6 shows the structure of the eyeglasses plate in FIG. 4.
Figure 7:
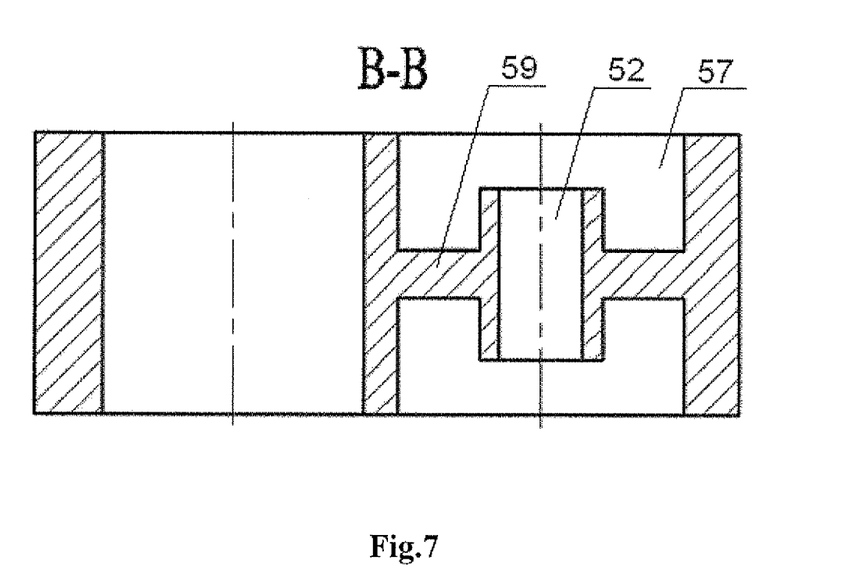
FIG. 7 is the cross-sectional view of the eyeglasses plate in FIG. 6.

The double-disc which has an eyeglasses plate with diversion hole, as shown is FIGS. 4 and 5, comprises hollow cylindrical middle valve body 150 with the left valve body 101 and right valve body on each side respectively. The three parts of the body are connected by bolts 107 and nuts 108 and the jointing is sealed with gaskets 103, and within the body a valve cavity 10 is formed. The groove in the valve passage of the left valve body 101 is for placing left valve seat 104; and the groove in the valve passage of the right valve body 102 is for placing right valve seat 105. Valve stem assembly 100 comprises a sleeve 112, compression ring 113, packing assembly 114, packing 116, rocker arm 117, and the valve stem 118. Through a hole on the right valve bogy 102, the valve stem 118 lies across the valve cavity 10 and is inserted in the groove on the left valve body 101. The sleeve 112 and the compression ring 113 help the stem 118 suited in the groove of the left valve body 101; the part of the stem 118 inside the valve cavity is fixed by the sleeve 112 and the compression ring 113 and the part outside the valve cavity is installed by the packing assembly 114 and the packing plate 116. The end of the part of the stem 118 outside the body is connected with the rocker arm 117 through pins and end plates and the rocker arm 117 links with the manual, electrical or pneumatic actuator.

The shape of the top plane view of the eyeglasses plate 50 located in the valve cavity 10 is sector, semicircle or T-shaped. There are three holes in the eyeglasses plate 50. The first one is the stem-connecting hole 49, and the stem 118 is connected with the eyeglasses plate 50 through this hole. Moreover, a flange in the middle of the stem 118 and the sleeve 112, the compression ring 113 on the stem 118 within the cavity 10 can avoid the movement between the eyeglasses plate 50 and the stem 118. The second hole is the diversion hole 51, which has a greater diameter of outer wall than the diameter of the valve passage, and the structure of its inner wall could be cylindrical shape, drum shape, taper shape and so on. The height of the diversion hole is the same as the length of the valve passage passing through the valve cavity which is between the left valve seat 104 and the right seat 105, so that the diversion hole makes the valve passage and the valve cavity isolated. The third one is the disc-placing hole 57, inside of which placed a round baffle plate 59 with many ventholes 58. The spring cavity 52, with a spring setting inside, is fixed in the center of the baffle plate 59. There is a valve disc 140 on both sides of the baffle plate in the disc-placing hole 57 and the two ends of the spring are against the discs. The action of the spring also pushes the discs against the sealing surfaces of the left and right seats, so that the discs could rotate along the axis of the spring cavity 52. The ventholes 58 on the baffle plate 59 surrounding the spring cavity 52 balance the pressure on the sides of the discs 140.

The best location of the three holes in the eyeglasses plate 50 is: the distance between the centers of the diversion hole 51 and the stem-connecting hole 49 equals the distance (l in FIG. 8) between the centers of disc-placing hole 57 and the stem-connecting hole 49, which also equals the distance between the axes of the valve passage and the stem 118. This assures that the diversion hole 51 is concentric with the valve passage when the valve in the full opening position and the discs 140 is concentric with the valve passage when the valve in the full closing place. Moreover, the diameter of the inner wall equals the diameter of the valve passage. The minimum distance between the inner wall of the diversion hole 51 and the inner wall of the disc-placing hole 57 should be less than the width of the sealing surface of the valve seats.

The eyeglasses plate 50 could be made as a whole or welded by different pieces, according to the diameter size of the valve passage or the practical application.

Figure 8:
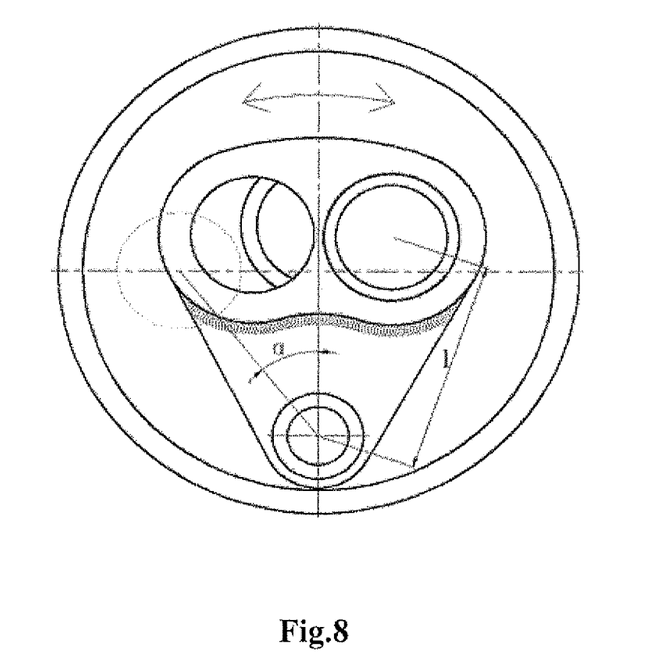
FIG. 8 shows the movement direction of the valve in FIG. 4.

As shown in FIG. 8, the eyeglasses plate 50 rotates by the axis (also the center of the stem-connecting hole) of the stem 118 (the arrow direction in FIG. 8).

Figure 9:
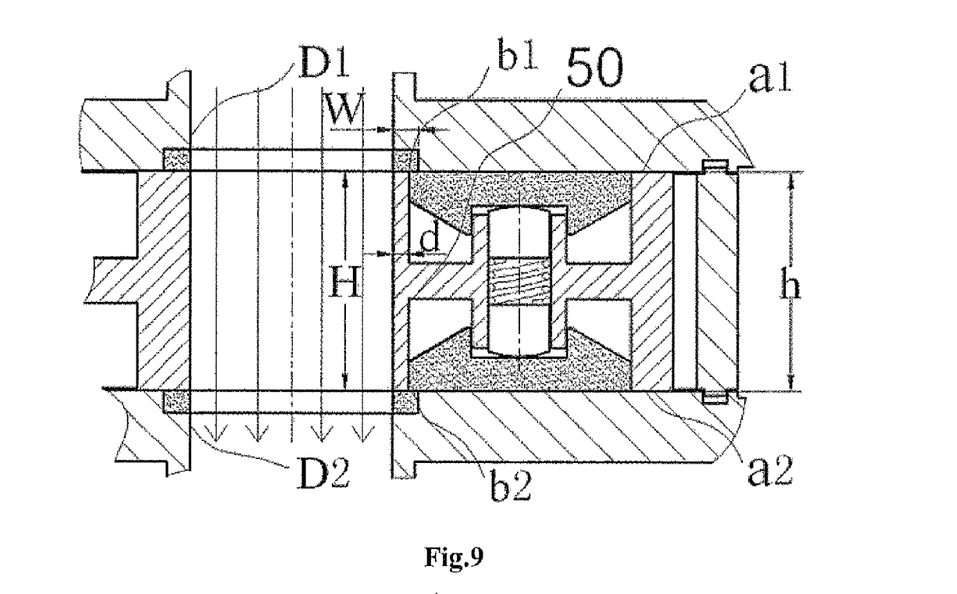
FIG. 9 shows the valve in the full opening position.

When in full opening position, as in FIG. 9, the distance h between the upper and bottom surfaces of the eyeglasses plate 50 is the same as the distance H between the surfaces of the left and right valve seats, assuring that the surfaces moves smoothly and the material flow passes the diversion hole 51 as through the pipe D1 and D2. Given the thinnest distance d between the diversion hole 51 and the disc-placing hole 57 is less than the width W of the sealing surface of the seat, the surfaces of the disc and the seat could touch each other tightly without taking apart.

Figure 10:
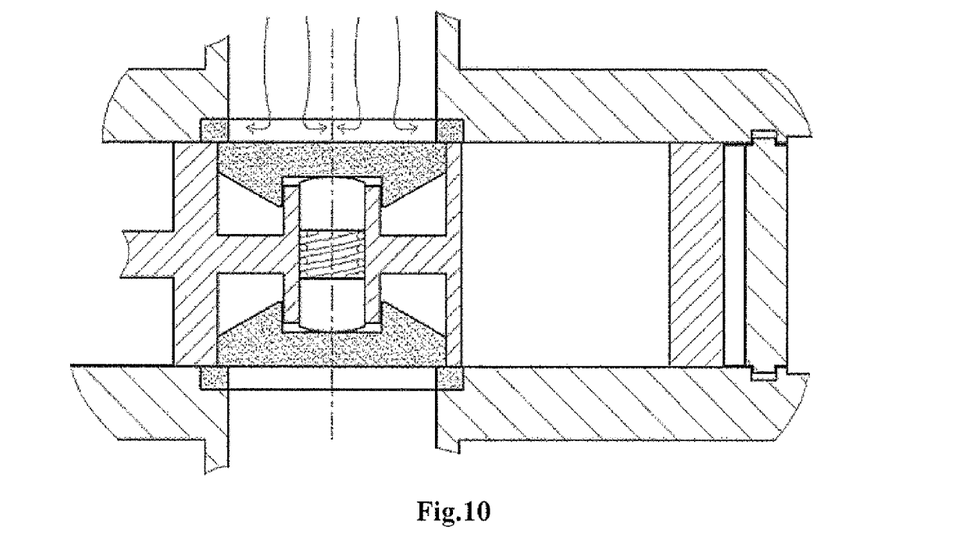
FIG. 10 shows the valve in the full closing position.

When in full closing place, as in FIG. 10, the eyeglasses plate 50 is rotating by the axis (also the center of the stem-connecting hole) of the stem 118, and by the compression of the spring 149 in the spring cavity 52, the surfaces of the two discs could touch the surfaces of the left valve seat 104 and the right valve seat 105 tightly, achieving the closing effect.

Figure 11:
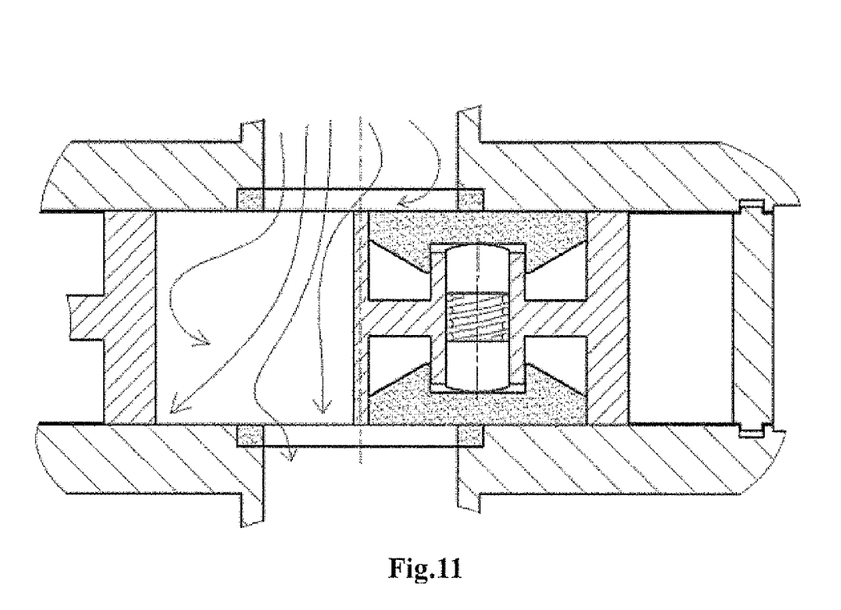
FIG. 11 shows the valve in the middle position.

In the middle place where the valve is open but the diversion hole 51 is not in the full opening position, as in FIG. 11, the materials flow through the diversion hole 51 without entering the valve cavity 10 due to the eyeglasses plate 50, and the volume changes with the opening position. In the process from opening to closing, a part of materials stay in the cavity formed by the diversion hole and the flange of the valve body after the valve is closed. Then in the process from closing to opening, the stayed part will be returned to the valve passage with the push of the inner wall of the diversion hole.

Embodiment 2

Figure 12:
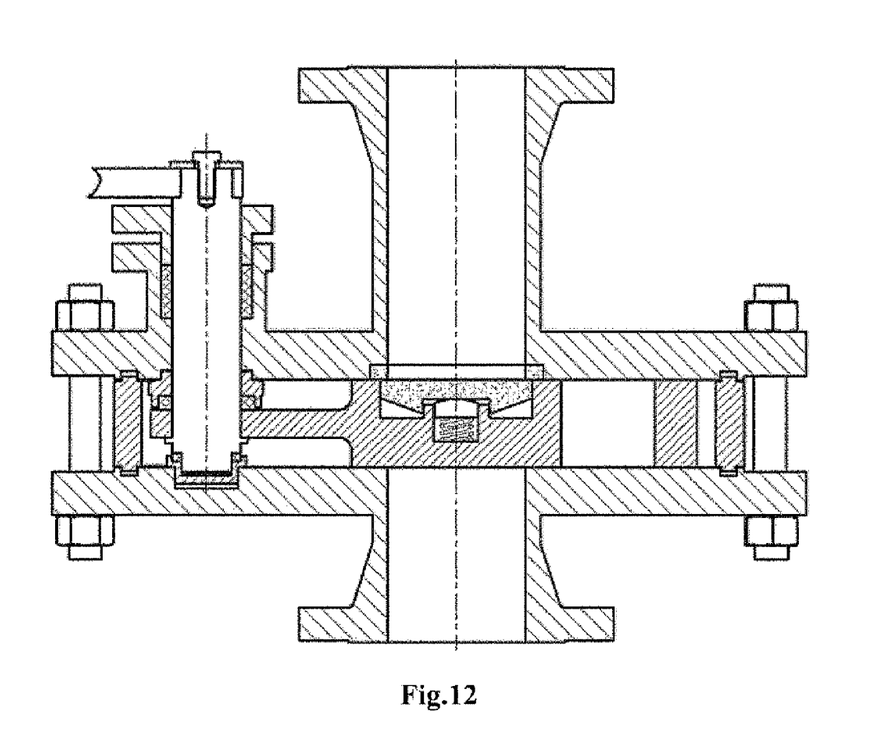
FIG. 12 is a prospective view of the second embodiment of the present invention with single disc and an eyeglasses plate with diversion hole.
Figure 13:
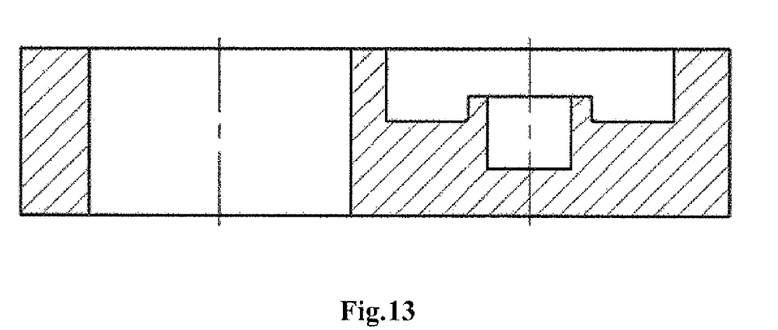
FIG. 13 is the cross-sectional view of the eyeglasses plate in FIG. 12.

FIGS. 12 and 13 show a disc valve with diversion hole and single-disc. Compared with the double-disc structure (in FIG. 4), the structures of the diversion hole 51 are the same, but the disc-placing hole 57 in this embodiment is shaped as a bore with end wall. Due to the lack of the second disc, the spring cavity also has end wall to implement the compression of spring. The end wall of the disc-placing hole 57 can be the baffle plate 59 with or without ventholes 58. Correspondingly, the valve passage with the disc has a valve seat.

Embodiment 3

Figure 14:
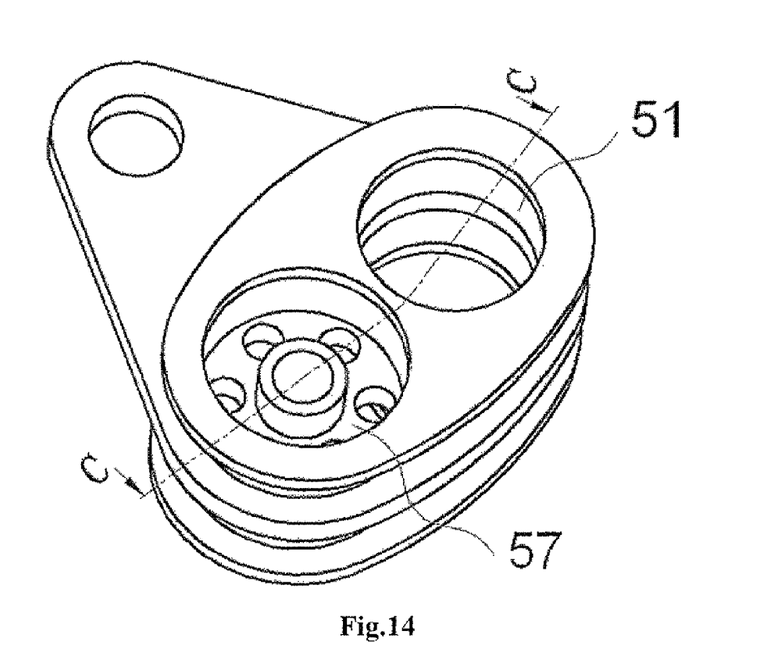
FIG. 14 is a prospective view of another embodiment of eyeglasses plate for double-disc.
Figure 15:
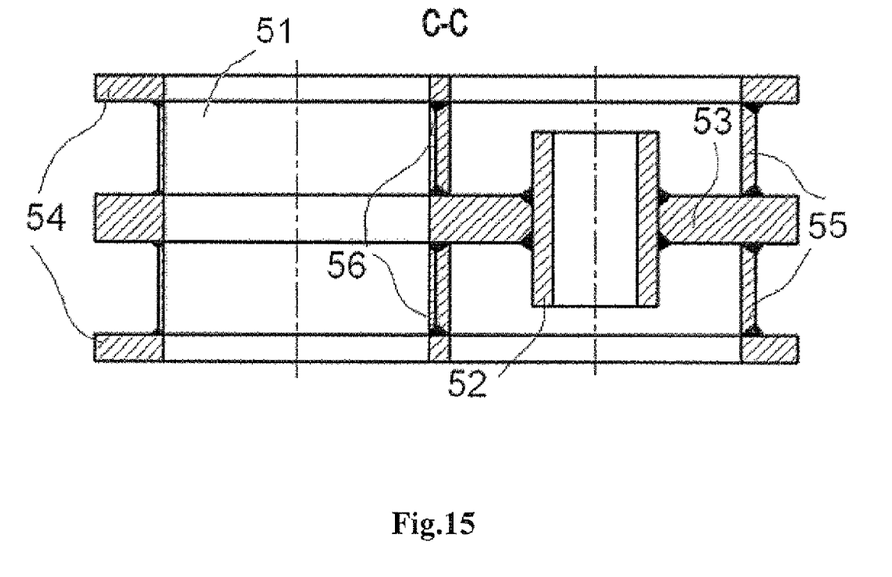
FIG. 15 is the cross-sectional view of the eyeglasses plate in FIG. 14.

When the diameter of the valve passage is large and the working condition is not hard, the eyeglasses plate could be welded by pieces as shown in FIGS. 14 and 15. The welded eyeglasses plate 50 comprises a spring cavity 52, connecting plate 53, side plate 54, disc sleeve 55 and diversion tube 56. Considering the intensity requirements, the connecting plate 53 is a piece of flat plate with three holes: one is stem-connecting hole 49 fixed with the stem; one is the diversion hole 51 welded with the diversion tube 56 concentrically; the last one is spring cavity 52 welded with the disc sleeve 55 concentrically, and around the spring cavity 52 are ventholes. The side plate 54 is also a piece of flat plate with two holes: one is welded with the diversion tube 56 concentrically; the other is welded with the disc sleeve 55 concentrically and the diameter of the hole is equal with that of the disc. After the two side plates are welded, the height of the outer surfaces between the two side plates equals the distance between the left and right valve seats.

The disc valve is suitable for a high-abrasion process system containing solid granules such as polycrystalline silicon, organic silicon, aluminum oxide, power station ash and the like. Because the disc valve effectively solves the problem of material accumulation in the valve cavity of the disc valve, the valve is not blocked and is particularly suitable to be used as an ash discharging valve for replacing the conventional valves.

What is claimed is:

1. A disc valve comprising:
a valve body with a valve passage, said valve body having a valve cavity communicating with said passage, and comprising a valve stem as well, is characterized by: said stem connecting with an eyeglasses plate in said valve cavity, said eyeglasses plate comprising a stem-connecting hole, a diversion hole and a disc-placing hole, said stem-connecting hole connecting the valve stem and the eyeglasses plate, said disc-placing hole having a spring cavity, a baffle plate connecting said spring cavity and said disc-placing hole, with discs placed in the disc-placing hole and located on the top of said spring cavity, said spring cavity having a spring and said spring pushing the discs,
wherein said eyeglasses plate is sector, semicircle or T-shaped, and is welded by the spring cavity, a connecting plate, a side plate, a disc sleeve, and a diversion tube; said connecting plate is a piece of flat plate, having three holes: a stem-connecting hole fixed with the stem, a diversion hole welded with the diversion tube concentrically, another hole welded with the spring cavity and the disc sleeve concentrically; the side plate is also a piece of flat plate with two holes: one welded with the diversion tube concentrically; the other welded with the disc sleeve concentrically.

2. The disc valve of claim 1, wherein the height of said diversion hole equals the length of the valve passage in the valve cavity, and the diameter of the outer wall of said diversion hole is larger than the diameter of the valve passage.

3. The disc valve of claim 1, wherein the distance between the axes of the valve passage and said stem, the distance between the centers of said diversion hole and said stem-connecting hole, the distance between the centers of said disc-placing hole and said stem-connecting hole, are the same.

4. The disc valve of claim 1, wherein said disc-placing hole and said spring cavity are through holes, with two discs located on the two sides of said spring cavity in said disc-placing hole respectively; or said disc-placing hole and said spring cavity are blind holes, with one disc located on the said spring cavity in said disc-placing hole.

5. The disc valve of claim 1, wherein said baffle plate has at least a vent hole to keep the balance of the pressure on the two sides of said baffle plate.

6. The disc valve of claim 1, wherein the height of said disc-placing hole equals the height of said diversion hole, and the diameter of the inner wall of said diversion hole equals the diameter of the valve passage.

7. The disc valve of claim 1, wherein the valve comprises a left valve seat and a right valve seat in the place where the valve passage communicates with the valve cavity, and the minimum distance between the inner wall of said diversion hole and the inner wall of said disc-placing hole is less than the width of the sealing surface of the left and right valve seats.

* * * * *